(12) United States Patent
Keinan et al.

(10) Patent No.: US 10,754,671 B2
(45) Date of Patent: Aug. 25, 2020

(54) SYNCHRONIZING USER INTERFACE CONTROLS

(71) Applicant: SAP Portals Israel Ltd., Ra'anana (IL)

(72) Inventors: Gilad Keinan, Kfar Saba (IL); Guy Soffer, Kfar Saba (IL)

(73) Assignee: SAP Portals Israel Ltd., Ra'anana (IL)

( * ) Notice: Subject to any disclaimer, the term of this patent is extended or adjusted under 35 U.S.C. 154(b) by 49 days.

(21) Appl. No.: 16/048,889

(22) Filed: Jul. 30, 2018

(65) Prior Publication Data

US 2020/0034161 A1    Jan. 30, 2020

(51) Int. Cl.
| | |
|---|---|
| *G06F 9/451* | (2018.01) |
| *G06F 8/38* | (2018.01) |
| *G06F 9/445* | (2018.01) |
| *G06F 3/0481* | (2013.01) |

(52) U.S. Cl.
CPC ............ *G06F 9/451* (2018.02); *G06F 3/0481* (2013.01); *G06F 8/38* (2013.01); *G06F 9/44526* (2013.01)

(58) Field of Classification Search
CPC .... G06F 9/451; G06F 9/44526; G06F 3/0481; G06F 8/38
See application file for complete search history.

(56) References Cited

U.S. PATENT DOCUMENTS

| | | | |
|---|---|---|---|
| 8,423,895 B2 | 4/2013 | Friedman et al. | |
| 8,489,561 B1 | 7/2013 | Nathan et al. | |
| 8,875,060 B2 | 10/2014 | Barak et al. | |
| 8,965,987 B2 | 2/2015 | Lehmann et al. | |
| 8,997,038 B2 | 3/2015 | Bozek et al. | |
| 9,026,647 B2 | 5/2015 | Soffer et al. | |
| 9,032,287 B2 | 5/2015 | Lehmann et al. | |
| 9,036,648 B2 | 5/2015 | Kubovsky et al. | |
| 9,117,066 B2 | 8/2015 | Nathan et al. | |
| 9,158,556 B2 | 10/2015 | Barak et al. | |
| 9,262,745 B2 | 2/2016 | Zur et al. | |
| 9,342,618 B2 | 5/2016 | Lehmann et al. | |
| 9,355,188 B2 | 5/2016 | Nathan et al. | |
| 9,678,726 B1 | 6/2017 | Massaguer et al. | |
| 2003/0172010 A1 | 9/2003 | Butani et al. | |
| 2007/0288891 A1 | 12/2007 | Aakolk et al. | |
| 2008/0163162 A1 | 7/2008 | Shaburov et al. | |
| 2008/0263509 A1 | 10/2008 | Brutman et al. | |
| 2008/0301626 A1 | 12/2008 | Sivaram et al. | |
| 2009/0228866 A1 | 9/2009 | Lochmann et al. | |
| 2010/0058170 A1 | 3/2010 | Demant et al. | |
| 2010/0175044 A1 | 7/2010 | Doddavula et al. | |

(Continued)

OTHER PUBLICATIONS

U.S. Appl. No. 15/188,165, filed Jun. 21, 2016, Fishler et al.

*Primary Examiner* — Andrew T Chiusano
(74) *Attorney, Agent, or Firm* — Fish & Richardson P.C.

(57) ABSTRACT

Implementations of the present disclosure disclose synchronizing UI controls. At each user interface (UI) control associated with an application, a corresponding plugin is created, where the created plugin is associated with a technology and a UI view, and where the application includes a plurality of UI controls. Each UI control associated with the application is registered to a database, where each UI control is registered as a subscriber associated with a tag. An event is sent from at least one UI control to the database according to a change that occurred on that UI control. Each of the registered UI controls associated with the tag are updated.

20 Claims, 6 Drawing Sheets

(56) References Cited

U.S. PATENT DOCUMENTS

| | | |
|---|---|---|
| 2011/0113436 A1 | 5/2011 | Pal et al. |
| 2011/0209144 A1 | 8/2011 | Rowe et al. |
| 2011/0264684 A1* | 10/2011 | Shafigi ................ G06F 16/9535 707/769 |
| 2012/0143819 A1* | 6/2012 | Tan ....................... G06F 16/258 707/626 |
| 2012/0162246 A1 | 6/2012 | Kinarti et al. |
| 2013/0127920 A1 | 5/2013 | Grinshpon et al. |
| 2013/0166678 A1 | 6/2013 | Barak et al. |
| 2013/0262626 A1 | 10/2013 | Bozek et al. |
| 2014/0059516 A1 | 2/2014 | Feber et al. |
| 2014/0068545 A1 | 3/2014 | Lehmann et al. |
| 2014/0189804 A1 | 7/2014 | Lehmann et al. |
| 2014/0237443 A1 | 8/2014 | Pana et al. |
| 2014/0317563 A1 | 10/2014 | O'Byrne |
| 2014/0330896 A1* | 11/2014 | Addala ............... H04L 67/1095 709/203 |
| 2014/0343981 A1 | 11/2014 | Blank et al. |
| 2014/0359735 A1 | 12/2014 | Lehmann et al. |
| 2014/0372427 A1 | 12/2014 | Lehmann et al. |
| 2015/0026755 A1 | 1/2015 | Lehmann et al. |
| 2015/0135163 A1 | 5/2015 | Mun et al. |
| 2015/0142781 A1 | 5/2015 | Nigam et al. |
| 2015/0186132 A1 | 7/2015 | Oliveri et al. |
| 2016/0041815 A1 | 2/2016 | Bhagat et al. |

* cited by examiner

SYNCHRONIZING USER INTERFACE CONTROLS

BACKGROUND

When building user interface (UI) applications, software developers often use a model-view-controller (MVC) architecture design pattern to integrate between an MVC to reduce coupling between a UI representation and a model. In this way, a software developer of the model may not necessarily be the same individual who develops the UI. The current MVC approach for data binding handles specific tasks of binding model data to a view in a specific UI technology programming model. Under this approach, if software developers want to support different use cases associated with data binding (for example, based on roles or geo-locations), there is a need to develop different controllers for each use case, or to develop one controller that can be used in all scenarios.

SUMMARY

The present disclosure describes methods and systems, including computer-implemented methods, computer program products, and computer systems for synchronizing user interface (UI) controls.

In an implementation, at each user interface (UI) control associated with an application, a corresponding plugin is created, where the created plugin is associated with a technology and a UI view, and where the application includes a plurality of UI controls. Each UI control associated with the application is registered to a database, where each UI control is registered as a subscriber associated with a tag. An event is sent from at least one UI control to the database according to a change that occurred on that UI control. Each of the registered UI controls associated with the tag are updated.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, the proposed solution can improve efficiency of end-users or administrators without a need to fill-in the same values in multiple locations of an application. Further, the proposed solution can improve the efficiency of the developer so as he can use the synchronizing UI control without binding it to a central database. In addition, the proposed solution enables the end user to work with similar Views, to update the Control once, to automatically propagate the Controller to all similar instances of the application, and to personalize the configuration once for all instances of the application.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
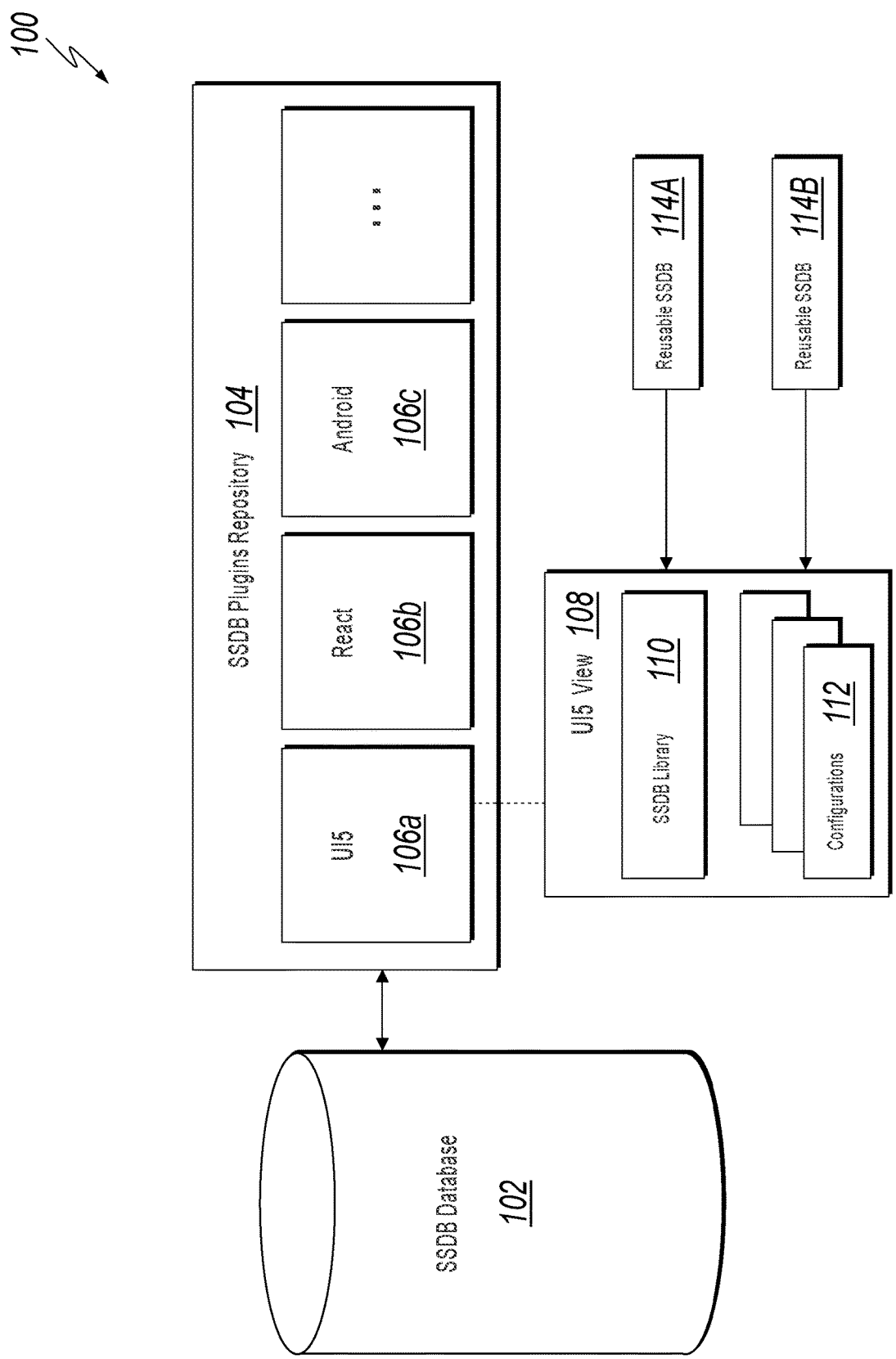
FIG. 1 is a block diagram illustrating an example system implementing a Smart Standalone Data Binding (SSDB) solution, according to an implementation of the present disclosure.

The following detailed description describes synchronizing UI controls and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Model-View-Controller (MVC) architecture design pattern is used by software developers for building user interface (UI) applications. This architecture is popular and is used in many different web applications and desktop applications (or "applications"). An MVC design pattern is based on dividing an entire application into three different sub-components: 1) model; 2) view; and 3) controller. Model represents data fetched from a web-service or a persistence layer. View represents what is presented to users and how users interact with the application, for example, UI screens viewed by the users. Controller can be considered to connect (or to glue) together the Model and the View. The Controller integrates the Model and the View by sending events between the Model and the View when a change is made in either the Model or the View. If something changed in the View, for example, an end user updates figures in the View, the Controller notifies the Model to update corresponding information in to data repository. Similarly, for a UI that displays information for employees, if a human resources (HR) department changes information associated with the employees in the Model, the Controller sends an event to the UI to update the View corresponding to the changed data.

The MVC design pattern is a popular design structure because it separates responsibilities by separating design implementations into independent layers, and allows simultaneous work to be performed between software developers responsible for different software components. In this way, a particular developer who develops the Model does not need to be the same individual who develops the UI (that is, a View) or the Controller, and software developers for the same application can work separately (for example, geographically remote or at different time) and work can be later integrated. The MVC has been used and tested with multiple programming languages (such as, JAVASCRIPT) and programmers.

The current MVC approach for data binding handles specific tasks of binding model data to the View in a specific UI technology programming model. If software developers want to support different use cases associated with data binding (for example, based on roles or geo-locations), there is a need to develop different controllers for each use case, or to develop one controller that can be used in all scenarios. This problem affects both the software developers and end users. For software developers, developing applications that permit management of data and associated Views/logic in a different software lifecycle than the application requires a large amount of effort that it specific to the used infrastructure. For example, each time a software developer selects a new technology, there is a need to write new programming code for the new technology. In addition, because a personalization/configuration that is based on a server requires a specific implementation, the software developer is required to learn the specific UI technology of data binding application programming interfaces (APIs), that is, learn how to integrate the MVC and to integrate the UI with the data. Because each use case is different from the standpoint of technical implementation, after developing the MVC for a specific Model, a developer needs to develop another MVC for a Model associated with a different use, and to integrate the Model into a corresponding database, a server, and a client associated with the new technology. This scenario is redundant and results in an unnecessary expenditure of resources (for example, time, and money) by the software developers.

In an enhanced scenario, where after the integration of the Model, the View, and the Controller, a software developer is required to develop some basic features for applications (for example, features such as validation of user input, or default values for each data field). Because each technology has its own validation, default values, and implementation types, the software developer is required to develop these features across the different technologies. On the other side, from an end user's perspective and for a distributed application (such as, a 3-tier application), the end user would prefer to work with similar Views, to update the Controller once, to automatically propagate the Controller to all similar instances of the application, and to personalize the configuration once for all instances of the application.

This disclosure provide a solution to the described problems, so that an administrator is able to control values globally without further development by a development team, and to fill the same value in a single UI control that will be visible in other UI locations.

Conventionally, the administrator would need to fill the same UI control multiple times in the same application but in multiple different hosting locations, and an end-user would also need to fill multiple forms where there is a need to fill their username multiple times in different UI controls. The described solution requires the administrator to fill the same UI control once with data and provides the ability to choose other UI control to fill with the same data.

The provided solution uses a Smart Standalone Data Binding (SSDB) technique that enables implementation of applications consisting of different software components existing in different software lifecycles. Data binding refers to binding data to a UI through Controller of a MVC. SSDB is an agnostic solution and can be integrated into any infrastructure (for example, a UI, database, or server). SSDB is not a competing solution to the MVC paradigm; on the contrary, it is a solution capable of enhancing an existing MVC. With the proposed solution, software developers do not need to learn and to implement MVC from scratch as data binding and certain logic is already implemented generically by SSDB. Furthermore, an end user is not be required to fill-in the same value on multiple UI controls, but in only one location that will be visible in other UI locations. In addition, complex personalization and configuration can be implemented with no software coding, and can support different scenarios, such as roles, default values, default-level hierarchy (for example, personal, local, and global). End users can also benefit from SSDB and use complex distributed applications (such as, a 3-tier application) as if they were a single standalone-application which adapts to an end user profile.

FIG. 1 is a block diagram illustrating an example system 100 implementing a SSDB solution, according to an implementation of the present disclosure. Notably, the SSDB solution can be implemented into a database, a view, or a server of the example system 100. In the example system 100, How the SSDB solution can be implemented in different views are illustrated.

The system 100 in FIG. 1 includes a SSDB plugin repository 104, which includes a set of plugins 106a, 106b, and 106c. The SSDB plugins repository 104 illustrates the plugins 106 already created for the example system 100. Each plugin is created on a UI control and corresponds to a particular type of technology (for example, UI5, React, and Android). If a software developer decides to use a new (different) technology for a UI control, a new plugin can be written and used for the new technology. In this way, the SSDB solution does not need to be upgraded each time a new technology is used, and the example system 100 is configured to support the new technology once the new plugin is added. In other implementations, the described principles and structures can be implemented for database technology and server technology. That is, a software developer can also create a set of plugins for specific database technology or server technology, where each created plugin corresponds to a new technology.

As a particular example, plugin UI5 106a corresponds to UI5 technology used for UI controls. The software developer can add reference to plugin UI5 106a by referring to an existing library desired to be used. The software developer can also provide configurations 112 for the described SSDB solution. Different categories of configurations are supported by the described solution. New types of configurations are also supported, since the described solution defines a generic approach that allows a new plugin to be added on-demand. For example, a new use case may have a different default value, but the software developers are not required to implement the new value into the application. Instead, a difference between the new value and previously used values in the application is implemented. Similarly, the configurations can also encompass a different role and a different validation that the software developers desire to allow in different UIs. As such, a UI5 view 108 can act as a monitor for the UI control to reflect the changes. For example, if a software developer wishes to create an employee UI view, configuration of the view can be defined, but configurations already defined by others can also be used. The configurations can be defined in reusable SSDBs, and a reusable SSDB can store validation rules and default values associated with the employee. Once a software developer defines the configurations in a SSDB, other software developers can use the reusable SSDB in their own applications.

The system 100 also includes a SSDB database 102 used for the described solution, not for an application. Once a software developer completes creation of the previously described plugins, information contained in the plugins can be deployed to the database 102. The database 102 can store features associated with the described solution, such as configurations, preparations, and default values of the effort associated with the described solution.

The SSDB database 102 contains domain tags (also referred to as "tag" herein) identifying, per user, a role, and default values. Tags are used to group similar configurations together. This allows simple management of configurations as developers can refer to a group as a whole and without a need to manage each configuration separately. Each UI control can register with the database as a subscriber associated with a tag from the database 102.

Once the application is loaded and before a UI appears, a call is made to obtain the UI. The SSDB library 110 communicates with the SSDB database 102. Roles, validations, and configuration features are active and modifies the UI to meet a specific use. For example, after a manager logs in to the application, a call can be made from the SSDB library 110 in the application to the SSDB database 102, and the SSDB database 102 can determine which UIs the manager can view and interact with.

Figure 2:
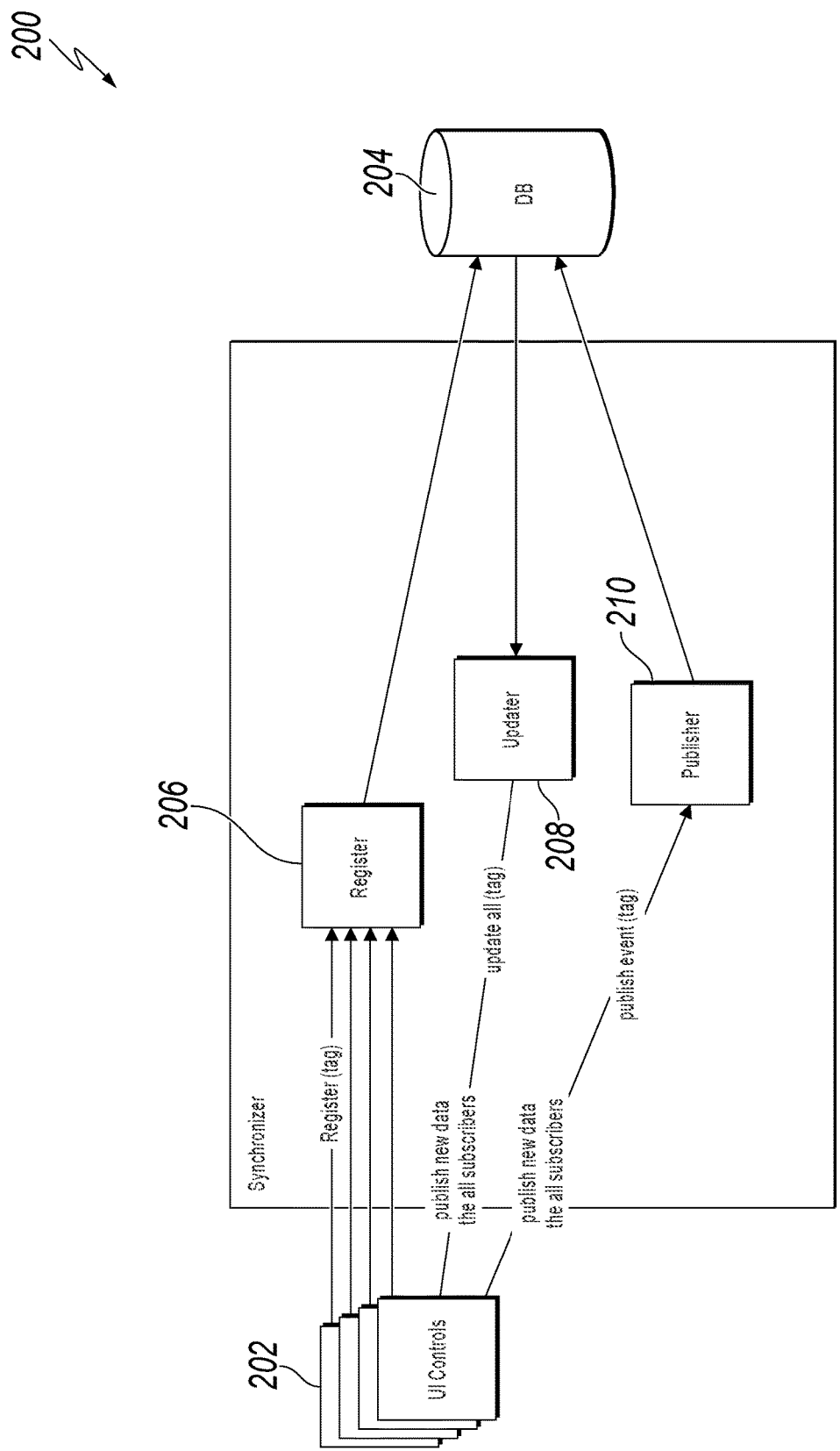
FIG. 2 is a block diagram illustrating an example system for synchronizing UI controls, according to an implementation of the present disclosure.

FIG. 2 is a block diagram illustrating an example system 200 for synchronizing UI controls, according to an implementation of the present disclosure. Usually when a web application is loaded, the UI controls are initialized, the related data is fetched from a Model, which is fetched from a Web Service. Other related data is not fetched and may be persisted using browser cookies or other methods. The example system 200 includes multiple UI controls 202, a centralized database 204, a register 206, an updater 208, and a publisher 210.

The register 206 is responsible for registering new UI controls to listen to data change events of the same type. The publisher 210 updates the centralized database 204 with a new value once a UI control was changed. Once data was changed by any of the UI controls, an event is raised to publish the change to all of the UI controls using the updater 208.

Each UI control 202 is associated with a plugin, with the process of creating the plugin described in FIG. 1. In the described solution, each UI control is registered using the register 206 as a subscriber of a tag. Once the UI control is registered, as a subscriber of a tag, the UI control can use the set of configurations belong to that specified domain tag. As an example, a developer, can register (that is, subscribe) specific domain tags to UI controls, meaning the developer's UI will use the set of configurations belonging to the specific domain tags. There are two flows between the UI and the database (managed by SSDB library):
  1. (Updater 208)—Get configuration data DB>UI, or
  2. (Publisher 210)—Set configuration data UI>DB.

In some implementations, the tag can contain information concerning roles, users, and default values associated with the UI control. This information can be stored in a centralized database 204. Once an end user changes a registered synchronized UI control 202, the UI control 202 will send event through a publisher 210 to persist the new value on the centralized database 204, changing the existing data values stored in the centralized database 204 and corresponding to the change. The centralized database 204 raises a published event and updated, through the updater 208, of the UI controls 202 that registered as subscribers to this tag with the change. The most updated value will be presented to the user based on "modified by" timestamp to prevent a case which a newer data is fetched from the database. Because the central database 204 is used in this solution, several UIs can update the same configuration at the same time, and the SSDB database 102 ensures the latest update is applied to the configurations.

As an example, a UI control 1 can be a UI control for a desktop application, and a UI control 2 can be a UI control for a mobile application. Both the UI controls 1 and 2 are registered to the centralized database 204 as subscribers with the same tag. If an end user makes changes to a background color setting for the UI control 1, the same change will be automatically reflected in UI control 2. As illustrated in FIG. 2, the described process can be performed without a development requirement to permit a synchronization to occur.

Figure 3:
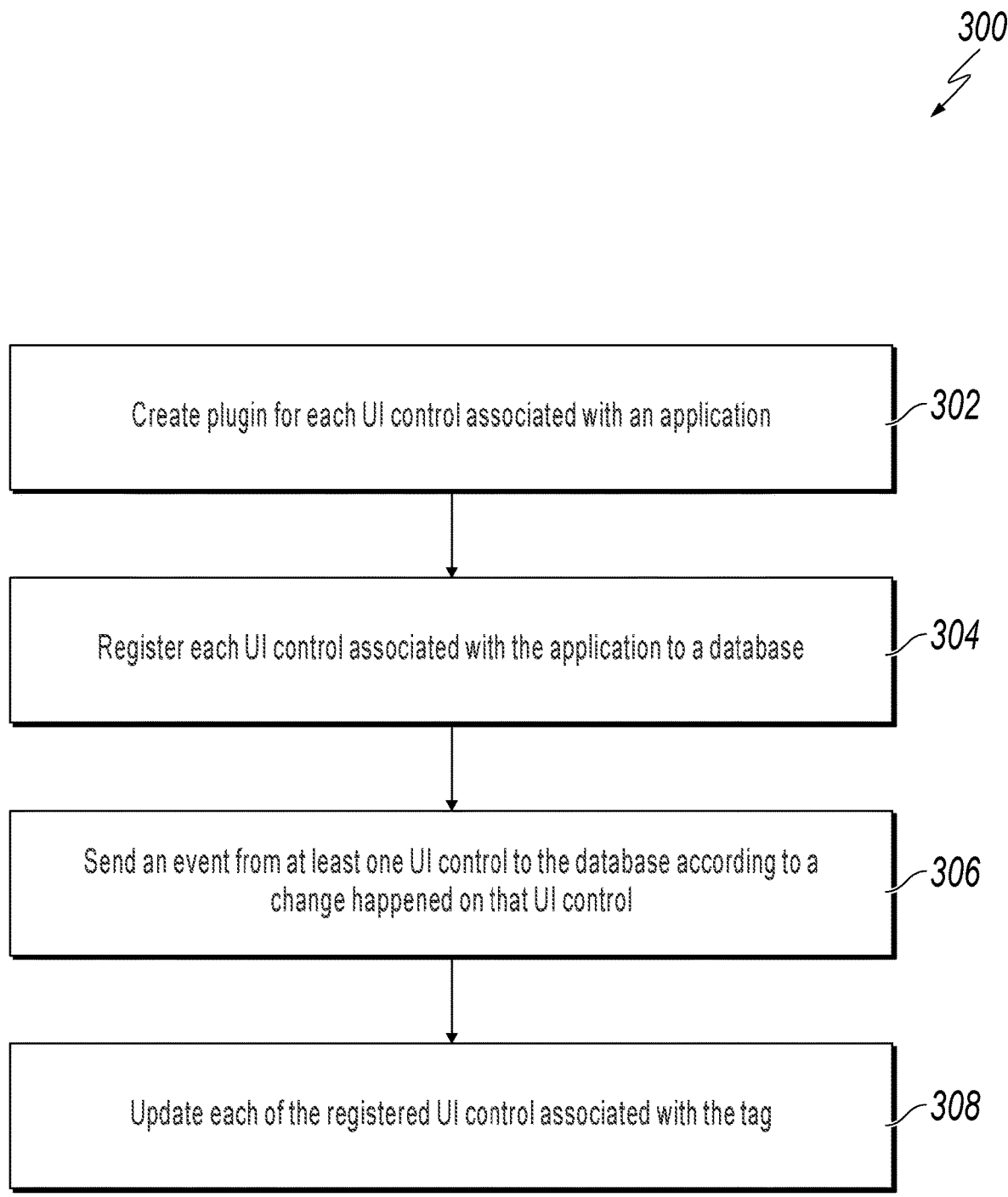
FIG. 3 is a flowchart illustrating an example process for synchronizing UI controls, according to an implementation of the present disclosure.

FIG. 3 is a flowchart illustrating an example process 300 for synchronizing UI controls, according to an implementation of the present disclosure.

At 302, a plugin is created for each corresponding UI control associated with an application comprising a plurality of UI controls. Each plugin is associated with a particular technology and a UI view. Each time a new technology is used, a corresponding plugin can be created and used for the technology. For example, if a software developer wishes to allow the SSDB to work with JAVASCRIPT, a one-time plugin is created that can connect SSDB to the particular JAVASCRIPT technology. The created plugin is stored in a SSDB plugin repository, where each plugin corresponds to a single technology. Each plugin can be created for a specific UI technology, database technology, or server technology. The plugins are connected to a SSDB database where data, configuration, default value, and features of the described solution are stored. In some implementations, references can be added to the plugin. The software developer can make reference to an existing library corresponding to the particular technology the plugin is associated with, and the software developer can use data from the library to test for functionalities. In some implementations, configurations can be provided for each plugin. The configurations can be default values, roles, and validations. The software developers do not need to implement the functionality for each configuration, instead, a difference between the new configurations and those already used in the application can be implemented. For example, implementing the difference between a default value of the new UI and those that were used in the application, or a different role desired to be allowed in the new UI. In some implementations, a SSDB can be created by a software developer to store the configurations, and the other software developers can use the reusable SSDBs for their own application. After step 302, the method 300 proceeds to step 304.

At 304, each UI control associated with the application is registered to the database, and each registered UI control is registered as a subscriber associated with a tag. After the created plugins from 302 are loaded into a corresponding UI control and information contained in each plugin is deployed to and stored in the SSDB database. The UI controls can register with the database as a "listener", meaning the UI controls can listen for data change events of the same type. Each tag is associated with a configuration particular to technology corresponding to the plugin. After step 304, the method 300 proceeds to step 306.

At 306, an event is sent from at least one UI control to the database according to a change that occurred on that UI control. The change can be a change to one of the configurations associated with a use case for the UI control, such as changes to the roles, users, default values, and validations. The sent event can persist the value on the database. Once the database receives the event, the database raises a publish event to the UI controls subscribing to the tag. After step 306, the method 300 proceeds to step 308.

At 308, each of the registered UI controls associated with the tag is updated. Here, a publish event is received at UI controls subscribing to the tag. Each of the UI controls possessing the tag is updated. After step 308, the method 300 stops.

Figure 4A:
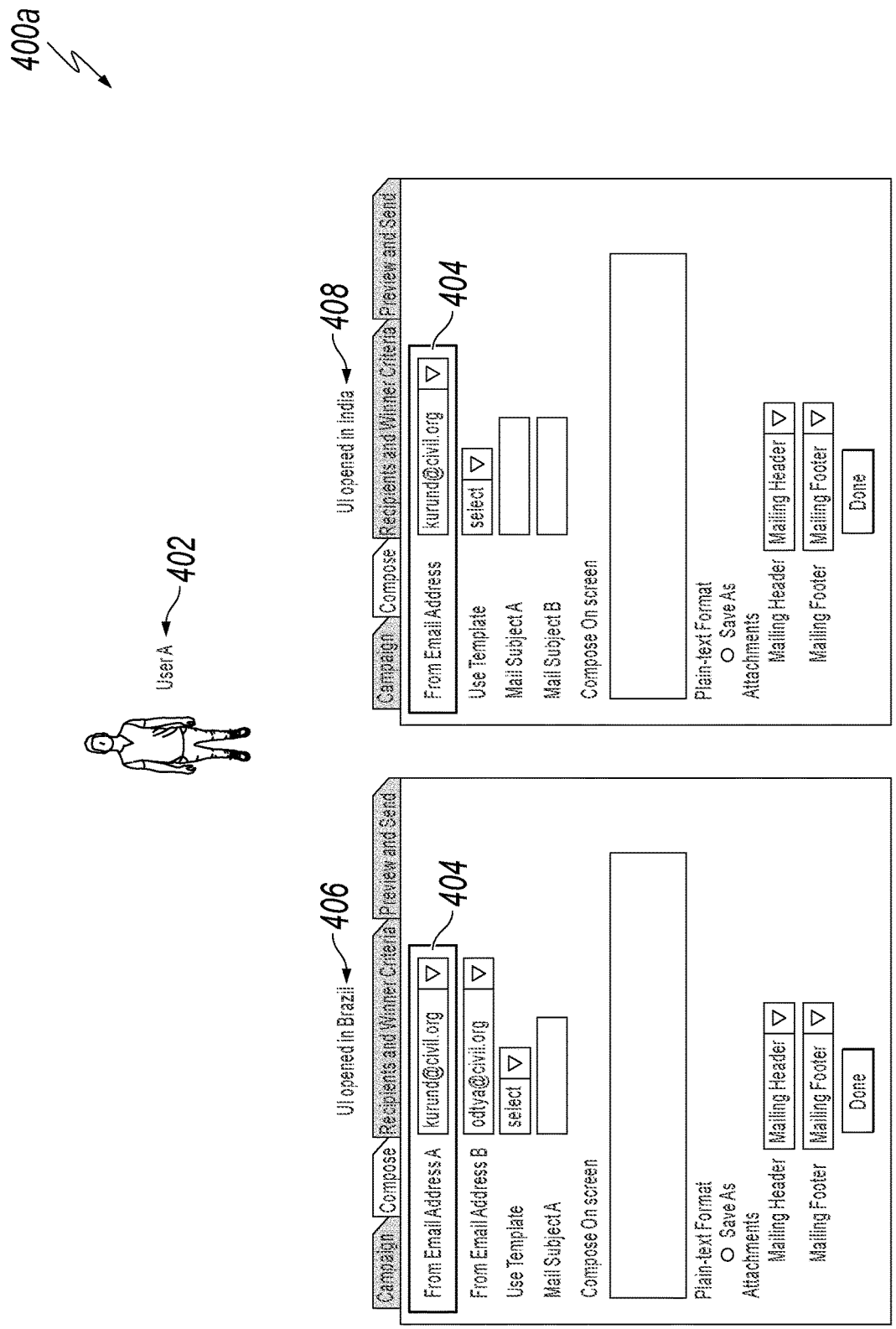
FIGS. 4A and 4B illustrate a set of screenshots illustrating an example of an application implementing a SSDB solution, according to an implementation of the present disclosure.
Figure 4B:
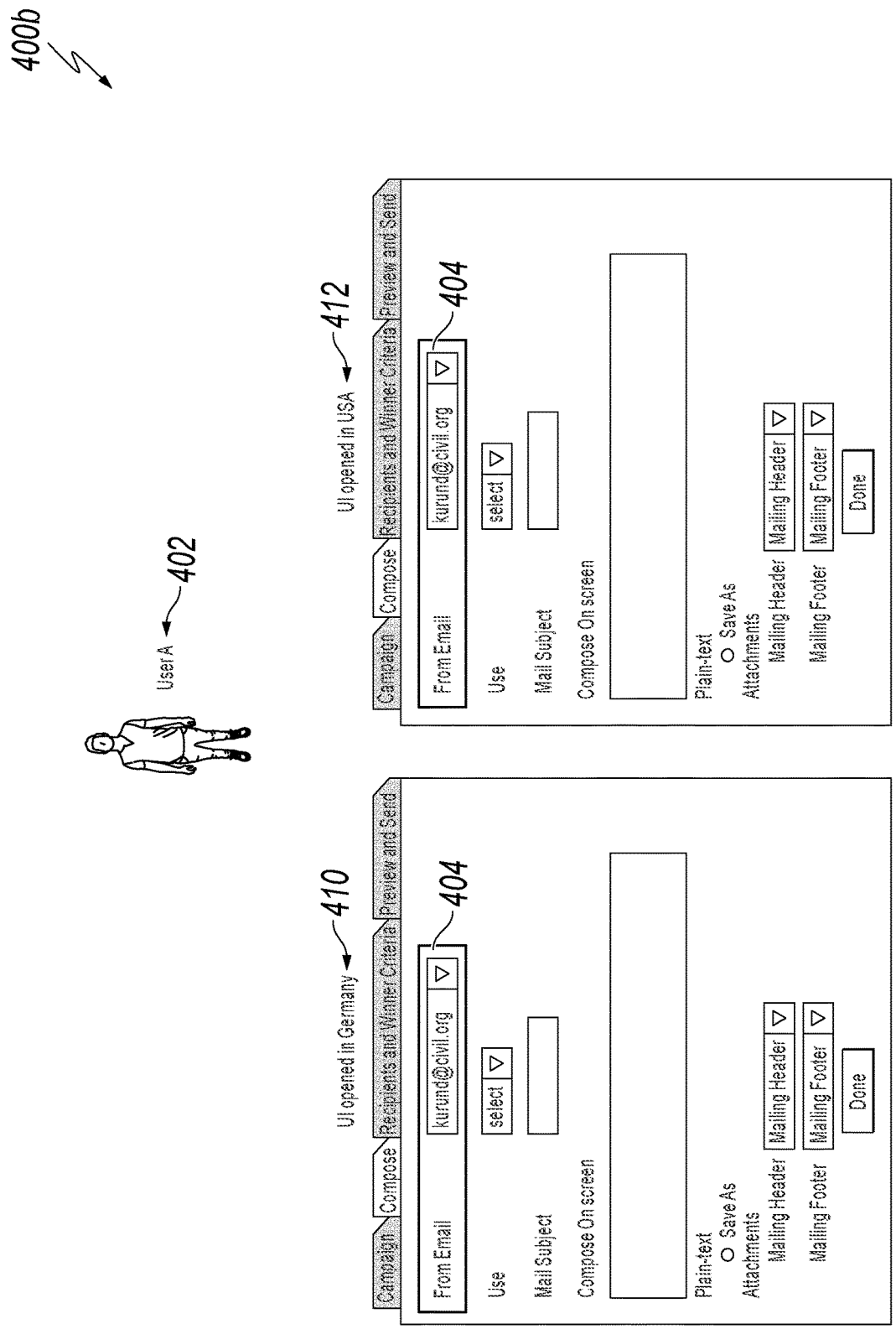

FIGS. 4A and 4B illustrate a set of screenshots 400 illustrating an example of an application implementing a SSDB solution, according to an implementation of the present disclosure. The example application implementing a SSDB solution is used in different geographic regions. In this example, user A 402 is required to fill a username in multiple UI forms, and in each UI form there is a text area to ask user A 402 to fill-in a "color" desired to be used. The user A 402 can load the UI forms and register each UI form as a listener. An administrator can change one of the UI controls with a new value and the publisher can update the database with the value. Then the updater can update all of the subscribers with the change.

As illustrated in FIGS. 4A and 4B, the labeled rectangle 404 specifies locations the user A 402 would be required to fill-in a same value. In screenshot 406, the end user A 402 is updating a field in Brazil, and other users in India, Germany, and USA screenshots 408 (FIG. 4A), 410 (FIG. 4B), and 412 (FIG. 4B) will view the same updated information on their UI screens, accordingly.

Figure 5:
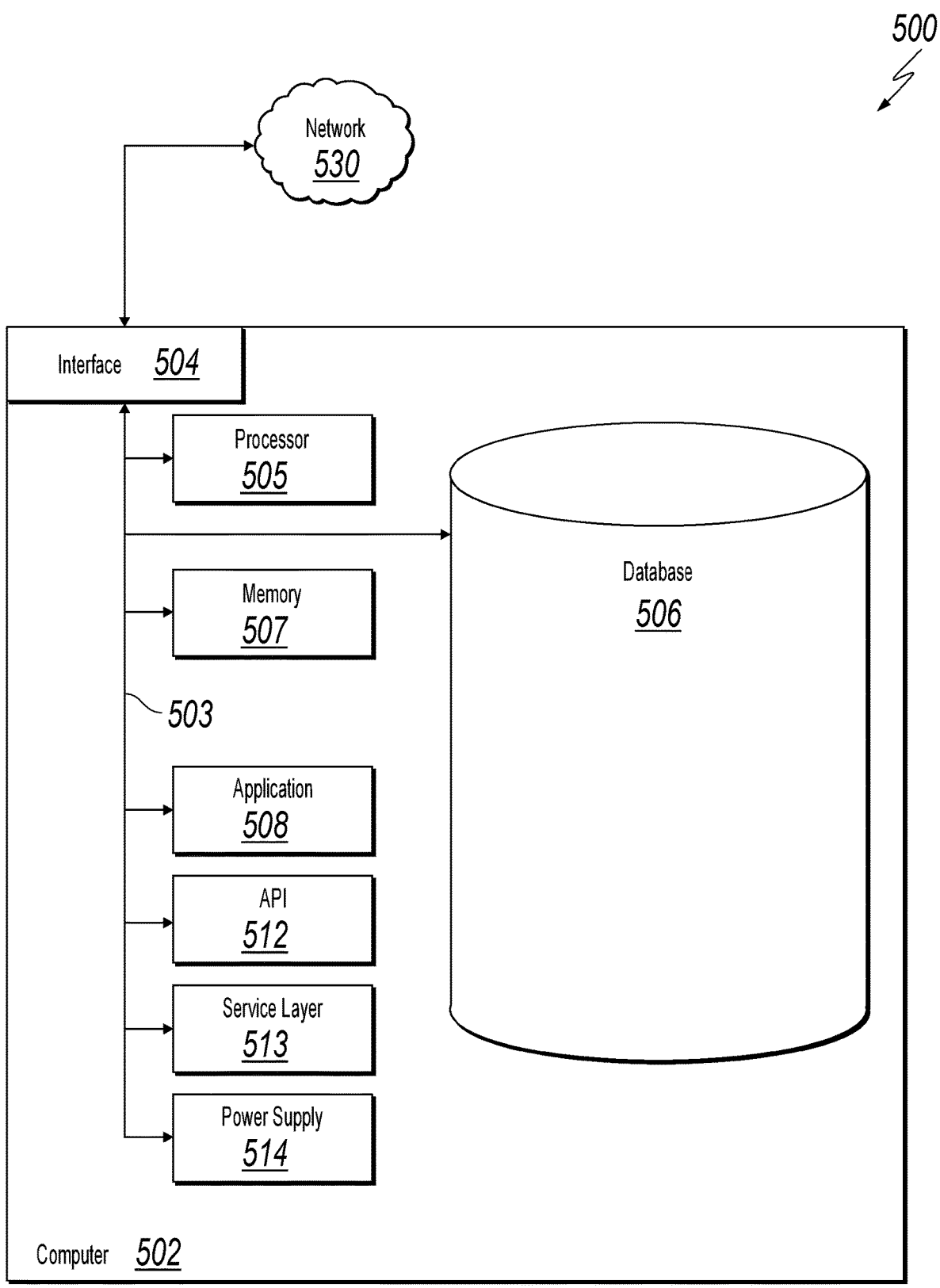
FIG. 5 is a block diagram illustrating an example of a computer-implemented System used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some implementations, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some implementations, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client", "user", or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, a computer-implemented method, comprising: creating, at each user interface (UI) control associated with an application, a corresponding plugin, the created plugin is associated with a technology and a UI view, and wherein the application comprises multiple UI controls; registering each UI control associated with the application to a database, and each UI control is registered as a subscriber associated with a tag; sending an event from at least one UI control to the database according to a change that occurred on that UI control; and updating each of the registered UI controls associated with the tag.

The foregoing and other described implementations can each, optionally, include one or more of the following features:

A first feature, combinable with any of the following features, wherein each plugin is connected to a Smart Standalone Data Binding (SSDB) database.

A second feature, wherein the technology associated with the plugin can be a view technology, a database technology, or a server technology.

A third feature, combinable with any of the previous or following features, wherein the UI view comprises configurations associated with a use case.

A fourth feature, combinable with any of the previous or following features, wherein the tag is associated with the configurations.

A fifth feature, combinable with any of the previous or following features, wherein the change can be a change to one of the configurations associated with the use case for the UI control.

A sixth feature, combinable with any of the previous or following features, wherein updating each of the registered UI control associated with the tag comprises: receiving, at the database, a publish event, wherein the publish event is associated with a change to the UI control; updating, at the database, values stored in the database based on the change; and raising a publish event from the database to update each of the registered UI control associated with the tag.

A seventh feature, combinable with any of the previous or following features, wherein each registered UI control listens for data change events of the same type.

In a second implementation, a non-transitory, computer-readable medium storing one or more instructions executable by a computer system to perform operations comprising: creating, at each user interface (UI) control associated with an application, a corresponding plugin, the created plugin is associated with a technology and a UI view, and wherein the application comprises multiple UI controls; registering each UI control associated with the application to a database, and each UI control is registered as a subscriber associated with a tag; sending an event from at least one UI control to the database according to a change that occurred on that UI control; and updating each of the registered UI controls associated with the tag.

A first feature, combinable with any of the following features, wherein each plugin is connected to a Smart Standalone Data Binding (SSDB) database.

A second feature, combinable with any of the previous or following features, wherein the technology associated with the plugin can be a view technology, a database technology, or a server technology.

A third feature, combinable with any of the previous or following features, wherein the UI view comprises configurations associated with a use case.

A fourth feature, combinable with any of the previous or following features, wherein the tag is associated with the configurations.

A fifth feature, combinable with any of the previous or following features, wherein the change can be a change to one of the configurations associated with the use case for the UI control.

A sixth feature, combinable with any of the previous or following features, wherein updating each of the registered UI control associated with the tag comprises: receiving, at the database, a publish event, wherein the publish event is associated with a change to the UI control; updating, at the database, values stored in the database based on the change; and raising a publish event from the database to update each of the registered UI control associated with the tag.

A seventh feature, combinable with any of the previous or following features, wherein each registered UI control listens for data change events of the same type.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: creating, at each user interface (UI) control associated with an application, a corresponding plugin, the created plugin is associated with a technology and a UI view, and wherein the application comprises multiple UI controls; registering each UI control associated with the application to a database, and each UI control is registered as a subscriber associated with a tag; sending an event from at least one UI control to the database according to a change that occurred on that UI control; and updating each of the registered UI controls associated with the tag.

A first feature, combinable with any of the following features, wherein each plugin is connected to a Smart Standalone Data Binding (SSDB) database.

A second feature, combinable with any of the previous or following features, wherein the technology associated with the plugin can be a view technology, a database technology, or a server technology.

A third feature, combinable with any of the previous or following features, wherein the UI view comprises configurations associated with a use case.

A fourth feature, combinable with any of the previous or following features, wherein the tag is associated with the configurations.

A fifth feature, combinable with any of the previous or following features, wherein the change can be a change to one of the configurations associated with the use case for the UI control.

A sixth feature, combinable with any of the previous or following features, wherein updating each of the registered UI control associated with the tag comprises: receiving, at the database, a publish event, wherein the publish event is associated with a change to the UI control; updating, at the database, values stored in the database based on the change; and raising a publish event from the database to update each of the registered UI control associated with the tag.

A seventh feature, combinable with any of the previous or following features, wherein each registered UI control listens for data change events of the same type.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time", "real time", "realtime", "real (fast) time (RFT)", "near(ly) real-time (NRT)", "quasi real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus", "computer", or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface", or "GUI", can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    creating, at each user interface (UI) control associated with an application, a corresponding plugin, wherein the created plugin is associated with a technology and a UI view, and wherein the application comprises a plurality of UI controls, each of the plurality of UI controls being configured to connect a portion of a model of the application with a respective portion of the UI view;
    registering each UI control associated with the application to a database, and wherein each UI control is registered as a subscriber associated with a tag identifying a role of a respective UI control and default values and enabling grouping of the plurality of UI controls based on configurations, wherein the configurations are usable by the respective UI control registered as the subscriber associated with the tag;
    sending an event from at least one UI control to the database according to a change that occurred on that UI control; and
    updating each of the registered UI controls associated with the tag.

2. The computer-implemented method of claim 1, wherein each plugin is connected to a Smart Standalone Data Binding (SSDB) database.

3. The computer-implemented method of claim 1, wherein the technology associated with the plugin can be a view technology, a database technology, or a server technology.

4. The computer-implemented method of claim 1, wherein the UI view comprises configurations associated with a use case.

5. The computer-implemented method of claim 4, wherein the tag is associated with the configurations.

6. The computer-implemented method of claim 4, wherein the change can be a change to one of the configurations associated with the use case for the UI control.

7. The computer-implemented method of claim 1, wherein updating each of the registered UI control associated with the tag comprises:
    receiving, at the database, a publish event, wherein the publish event is associated with a change to the UI control;

updating, at the database, values stored in the database based on the change; and raising a publish event from the database to update each of the registered UI control associated with the tag.

8. The computer-implemented method of claim 1, wherein each registered UI control listens for data change events of the same type.

9. A non-transitory, computer-readable medium storing one or more instructions executable by a computer system to perform operations comprising:

creating, at each user interface (UI) control associated with an application, a corresponding plugin, wherein the created plugin is associated with a technology and a UI view, and wherein the application comprises a plurality of UI controls, each of the plurality of UI controls being configured to connect a portion of a model of the application with a respective portion of the UI view;

registering each UI control associated with the application to a database, and wherein each UI control is registered as a subscriber associated with a tag identifying a role of a respective UI control and default values and enabling grouping of the plurality of UI controls based on configurations, wherein the configurations are usable by the respective UI control registered as the subscriber associated with the tag;

sending an event from at least one UI control to the database according to a change that occurred on that UI control; and updating each of the registered UI controls associated with the tag.

10. The non-transitory, computer-readable medium of claim 9, wherein each plugin is connected to a Smart Standalone Data Binding (SSDB) database.

11. The non-transitory, computer-readable medium of claim 9, wherein the technology associated with the plugin can be a view technology, a database technology, or a server technology.

12. The non-transitory, computer-readable medium of claim 9, wherein the UI view comprises configurations associated with a use case.

13. The non-transitory, computer-readable medium of claim 12, wherein the tag is associated with the configurations.

14. The non-transitory, computer-readable medium of claim 12, wherein the change can be a change to one of the configurations associated with the use case for the UI control.

15. The non-transitory, computer-readable medium of claim 9, wherein updating each of the registered UI control associated with the tag comprises:

receiving, at the database, a publish event, wherein the publish event is associated with a change to the UI control;

updating, at the database, values stored in the database based on the change; and raising a publish event from the database to update each of the registered UI control associated with the tag.

16. The non-transitory, computer-readable medium of claim 9, wherein each registered UI control listens for data change events of the same type.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

creating, at each user interface (UI) control associated with an application, a corresponding plugin, wherein the created plugin is associated with a technology and a UI view, and wherein the application comprises a plurality of UI controls, each of the plurality of UI controls being configured to connect a portion of a model of the application with a respective portion of the UI view;

registering each UI control associated with the application to a database, and wherein each UI control is registered as a subscriber associated with a tag identifying a role of a respective UI control and default values and enabling grouping of the plurality of UI controls based on configurations, wherein the configurations are usable by the respective UI control registered as the subscriber associated with the tag;

sending an event from at least one UI control to the database according to a change that occurred on that UI control; and updating each of the registered UI controls associated with the tag.

18. The computer-implemented system of claim 17, wherein each plugin is connected to a Smart Standalone Data Binding (SSDB) database, and wherein the technology associated with the plugin can be a view technology, a database technology, or a server technology.

19. The computer-implemented system of claim 17, wherein the UI view comprises configurations associated with a use case.

20. The computer-implemented system of claim 17, wherein updating each of the registered UI control associated with the tag comprises:

receiving, at the database, a publish event, wherein the publish event is associated with a change to the UI control;

updating, at the database, values stored in the database based on the change; and raising a publish event from the database to update each of the registered UI control associated with the tag.

* * * * *